United States Patent
Sun

(10) Patent No.: US 9,686,605 B2
(45) Date of Patent: Jun. 20, 2017

(54) PRECISE TRACKING OF SOUND ANGLE OF ARRIVAL AT A MICROPHONE ARRAY UNDER AIR TEMPERATURE VARIATION

(71) Applicant: Cisco Technology, Inc., San Jose, CA (US)

(72) Inventor: Haohai Sun, Sandvika (NO)

(73) Assignee: Cisco Technology, Inc., San Jose, CA (US)

( * ) Notice: Subject to any disclaimer, the term of this patent is extended or adjusted under 35 U.S.C. 154(b) by 381 days.

(21) Appl. No.: 14/282,633

(22) Filed: May 20, 2014

(65) Prior Publication Data
US 2015/0341719 A1   Nov. 26, 2015

(51) Int. Cl.
*H04R 1/32* (2006.01)
*H04R 3/00* (2006.01)
*G06K 9/00* (2006.01)

(52) U.S. Cl.
CPC .......... *H04R 1/32* (2013.01); *G06K 9/00228* (2013.01); *H04R 3/005* (2013.01)

(58) Field of Classification Search
CPC .......... H04R 3/005; H04R 1/32; H04R 1/326; H04R 2430/20; H04R 2430/21; H04R 2430/23; G06K 9/00; G06K 9/00255; G06K 9/00261; G06K 9/00268; G06K 9/00221; G06K 9/00248; G06K 9/00228; G06K 9/00234
USPC ......................................................... 381/92
See application file for complete search history.

(56) References Cited

U.S. PATENT DOCUMENTS

| 5,940,118 A * | 8/1999 | Van Schyndel | H04N 7/142 348/14.05 |
| 5,959,667 A * | 9/1999 | Maeng | H04N 7/15 348/14.08 |
| 6,593,956 B1 * | 7/2003 | Potts | G01S 3/7865 348/14.09 |
| 2014/0309994 A1 * | 10/2014 | Hsiao | G10L 15/25 704/233 |

OTHER PUBLICATIONS

Thiergart, et al., "Localization of Sound Sources in Reverberant Environments Based on Directional Audio Coding Parameters," AES 127th Convention, New York, NY, USA, Oct. 9-12, 2009, pp. 1-14.

(Continued)

*Primary Examiner* — Davetta W Goins
*Assistant Examiner* — Daniel Sellers
(74) *Attorney, Agent, or Firm* — Edell, Shapiro & Finnan, LLC

(57) ABSTRACT

A video conference endpoint detects a face and determines a face angle of the detected face relative to a reference direction based on images captured with a camera. The endpoint determines an angle of arrival of sound (i.e., a sound angle) received at a microphone array that transduces the sound relative to the reference direction based on the transduced sound and a sound speed parameter indicative of a speed of sound in air. The endpoint compares the face angle against the sound angle, and adjusts the sound speed parameter so as to reduce the angle difference if the compare indicates an angle difference greater than zero between the face and sound angles.

22 Claims, 7 Drawing Sheets

(56) References Cited

OTHER PUBLICATIONS

Elko, et al., "A Steerable and Variable First-Order Differential Microphone Array," 1997 IEEE International Conference on Acoustics, Speech, and Signal Processing, ICASSP-97, Apr. 1997, pp. 223-226.

Teutsch, et al., "An Adaptive Close-Talking Microphone Array," 2001 IEEE Workshop on Applications of Signal Processing to Audio and Acoustics, New Paltz, NY, USA, Oct. 21-24, 2001, 4 pages.

Teutsch, et al., "First-and Second-Order Adaptive Differential Microphone Arrays," 7th International Workshop on Acoustic Echo and Noise Control (IWAENC), Darmstadt, Germany, Sep. 2001, 4 pages.

Buck, "Aspects of First—Order Differential Microphone Arrays in the Presence of Sensor Imperfections," European Transactions on Telecommunications (ETT), vol. 13, No. 2, Mar.-Apr. 2002, pp. 115-122.

Buck, et al., "A Compact Microphone Array System with Spatial Post-Filtering for Automotive Applications," IEEE International Conference on Acoustics, Speech and Signal Processing (ICASSP 2009), Apr. 19-24, 2009, pp. 221-224.

Kerner, et al., "Two Microphone Array MVDR Beamforming with Controlled Beamwidth and Immunity to Gain Mismatch," 2012 International Workshop on Acoustic Signal Enhancement (IWAENC 2012), Sep. 4-6, 2012, 4 pages.

Sun, et al., "Robust Minimum Sidelobe Beamforming for Spherical Microphone Arrays," IEEE Transactions on Audio, Speech, and Language Processing, vol. 19, No. 4, May 2011, pp. 1045-1051.

Sun, et al., "Worst-Case Performance Optimization for Spherical Microphone Array Modal Beamformers," 2011 Joint Workshop on Hands-free Speech Communication and Microphone Arrays, May 30-Jun. 1, 2011, pp. 31-35.

Annibale, et al., "Speed of Sound and Air Temperature Estimation Using the TDOA-Based Localization Framework," IEEE Int. Conf. on Acoustics, Speech, and Signal Processing (ICASSP), Kyoto, Japan, Mar. 2012, pp. 229-232.

Annibale, et al., "Sound Speed Estimation from Time of Arrivals: Derivation and Comparison with TDOA-based Estimation," 20th European Signal Processing Conference (EUSIPCO 2012), Aug. 27-31, 2012, pp. 1014-1018.

Busso, et al., "Smart Room: Participant and Speaker Localization and Identification," IEEE International Conference on Acoustics, Speech, and Signal Processing (ICASSP) Mar. 18-23, 2005, 4 pages.

* cited by examiner

PRECISE TRACKING OF SOUND ANGLE OF ARRIVAL AT A MICROPHONE ARRAY UNDER AIR TEMPERATURE VARIATION

TECHNICAL FIELD

The present disclosure relates to techniques for tracking an angle of arrival of sound received at a microphone array in a video conference endpoint under air temperature variation.

BACKGROUND

A video conference endpoint includes a microphone to capture sound from a participant in a room and then the endpoint transmits the captured sound to a conference server or another endpoint. A controller in the endpoint may attempt to track a position of the participant based on an angle of arrival of the sound from the participant at the microphone. The controller computes the angle of arrival based on the speed of sound in air (i.e., air speed), which is a function of air temperature. Typically, the controller assumes an air temperature of, e.g., 20° C., and computes the angle of arrival based on that assumption. Often, the actual air temperature is much different from the assumed air temperature. As a result, the computed angle of arrival is different from the actual angle of arrival. This angle error can disrupt participant position tracking in the endpoint.

DESCRIPTION OF EXAMPLE EMBODIMENTS

Overview

Techniques presented herein precisely track an angle of arrival of sound received at a microphone array in a video conference endpoint under temperature variations. The endpoint includes a camera configured to capture images of a scene including one or more participants. The endpoint microphone array transduces sound received at the array from the one or more participants. The endpoint detects a face and determines a face angle of the detected face relative to a reference direction based on the captured images. The endpoint also determines an angle of arrival of sound (i.e., a sound angle) received at the microphone array relative to the reference direction based on the transduced sound and a sound speed parameter indicative of a speed of sound in air, such as air temperature. The endpoint compares the face angle against the sound angle and, if the compare indicates an angle difference greater than zero between the face and sound angles, adjusts the sound speed parameter so as to reduce the angle difference (between the face angle and a new sound angle recomputed based on the adjusted sound speed parameter).

Example Embodiments

Figure 1:
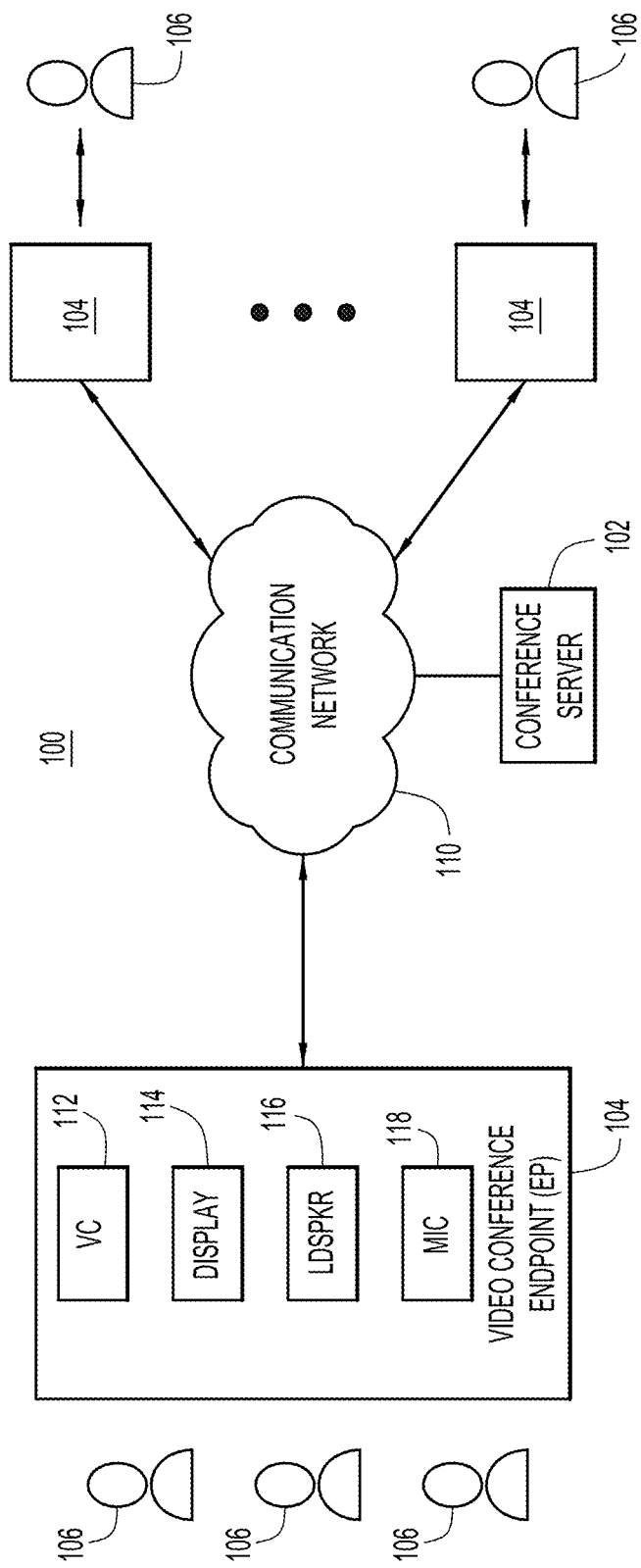
FIG. 1 is a block diagram of a video conference (e.g., teleconference) environment in which techniques to precisely track an angle of arrival of sound received at a microphone array in a video conference endpoint under temperature variations may be implemented, according to an example embodiment.

With reference to FIG. 1, there is depicted a block diagram of a video conference (e.g., teleconference) environment 100 in which techniques to precisely track an angle of arrival of sound received at a microphone array in a video conference endpoint (EP) under temperature variations may be implemented. Video conference environment 100 includes video conference endpoints 104 operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints.

Each video conference endpoint 104 (also referred to as a "teleconference device" 104) may include a video camera (VC) 112, a video display 114, a loudspeaker (LDSPKR) 116, and one or more microphone arrays (MIC) 118. The one or more microphone arrays 118 are referred to herein collectively as microphone arrays 118, and individually as microphone array 118. Endpoints 104 may be wired or wireless communication devices equipped with the aforementioned components, such as, but not limited to laptop and tablet computers, Smartphones, etc. In a transmit direction, endpoints 104 capture audio/video from their local participants 106 with microphone arrays 118/VC 112, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via loudspeaker 116/display 114.

Figure 2:
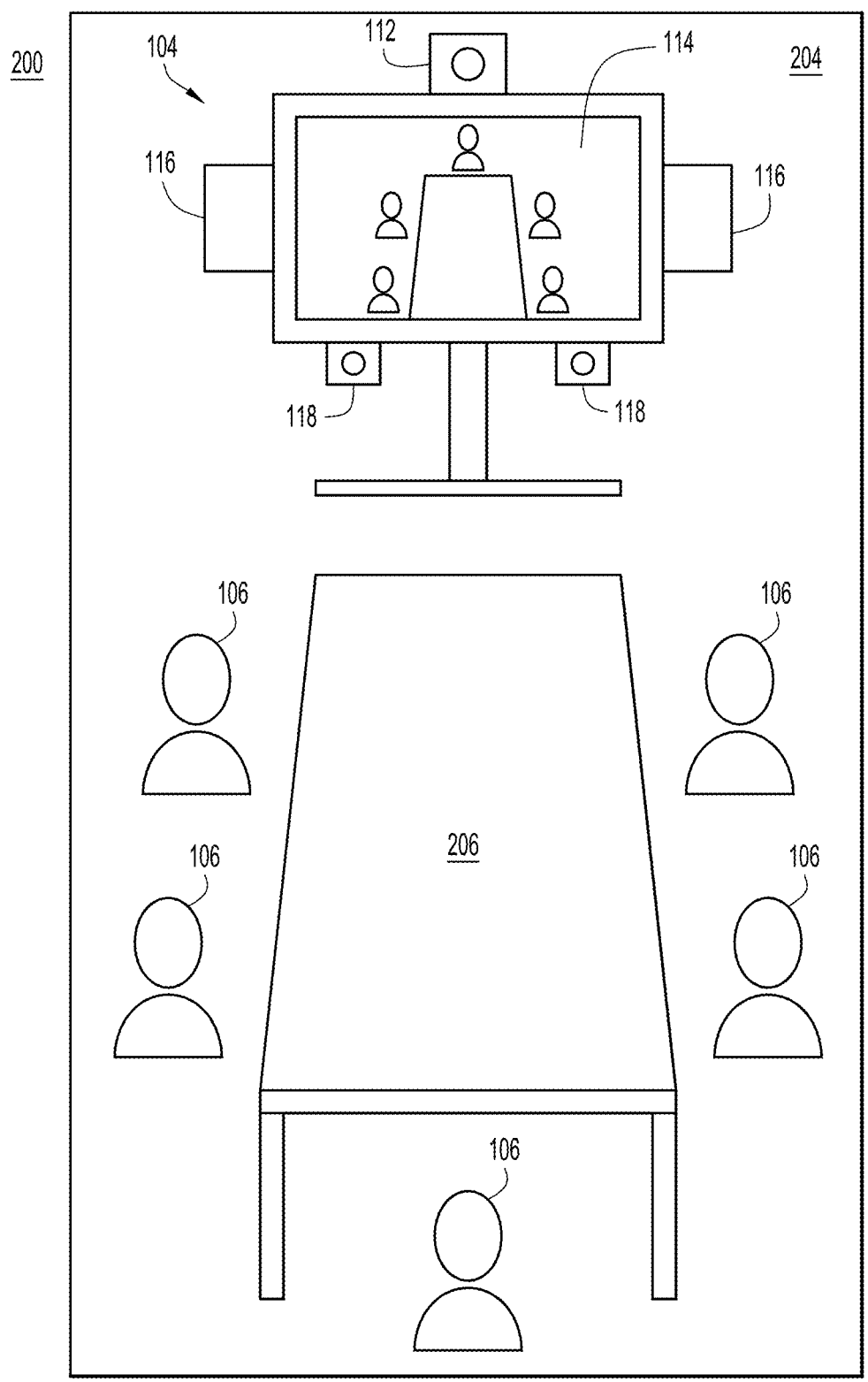
FIG. 2 is an illustration of a video conference endpoint deployed in a conference room and configured to perform the techniques presented herein, according to an example embodiment.

Referring now to FIG. 2, there is depicted an illustration of video conference endpoint 104 deployed in a conference room 204 (depicted simplistically as an outline in FIG. 2). Video camera 112 captures a video of a scene that includes multiple participants 106 facing the camera seated around a table 206 in room 204. Camera 112 typically includes pan, tilt, and zoom (PTZ) features. Video conference endpoint 104 pans, tilts, and zooms video camera 112 as necessary to frame a view of the scene encompassing all of the detected faces. In the example of FIG. 2, endpoint 104 includes spaced-apart microphone arrays 118(1) and 118(2) integrated with display 114. In another arrangement, microphone arrays 118(1) and 118(2) may be replaced with a single microphone array centered on display 114.

During a conference session, endpoint 104 performs sound tracking to track a position of each active talker among participants 106 based on sound received at each microphone array 118. To track each position, endpoint 104 determines an angle of arrival of sound from the corresponding active talker at each microphone array 118. The angle of arrival is computed based in part on an assumed speed of sound in air, which depends on a corresponding assumed temperature of the air through which the sound travels. A typical assumed temperature may be 20° C., for example, which corresponds to an assumed speed of sound of approximately 343 meters/second (m/s). As an actual air temperature varies from the assumed air temperature, an actual speed of sound (e.g., from 337-350 m/s) varies correspondingly from the assumed speed of sound, and thus the computed angle of arrival correspondingly deviates from an actual angle of arrival. As a result, actual temperature variation introduces an error between the computed and actual sound angles of arrival. Angle errors of 2-3 degrees result in position errors of 28 and 52 centimeters (cm) for a talker positioned 8 meters (m) from the microphone array. Position errors this large can lead to a result in which tracking algorithm confuse one participant with another.

Accordingly, techniques presented herein combine sound tracking based on sound received at each microphone array 118 with face tracking based on images of participants 106 captured with camera 112 to correct any error in the computed sound angle of arrival caused by air temperature variation. At a high level, camera 112 captures images of participants 106. Endpoint 104 uses face tracking to detect a face of one or participants 106, and determine a corresponding face angle from a reference direction based on the captured images. The determined face angle is assumed to correspond to the actual air temperature and thus serves as a calibration angle for subsequent sound tracking Endpoint 104 uses sound tracking to determine an angle of arrival of sound (i.e., a "sound angle") from the participant 106 at each microphone array 118 based on an initial assumed or default temperature (corresponding to an initial assumed air speed). Endpoint 104 compares the sound angle to the face angle and incrementally adjusts the assumed temperature in a direction that reduces a difference between the face angle and the sound angle—as recomputed based on the adjusted assumed temperature. The compare and adjust cycle is repeated until the face and recomputed sound angles are essentially equal because the adjusted assumed temperature (and thus assumed sound speed) and the actual temperature (and thus the actual sound speed) are essentially equal.

Figure 3:
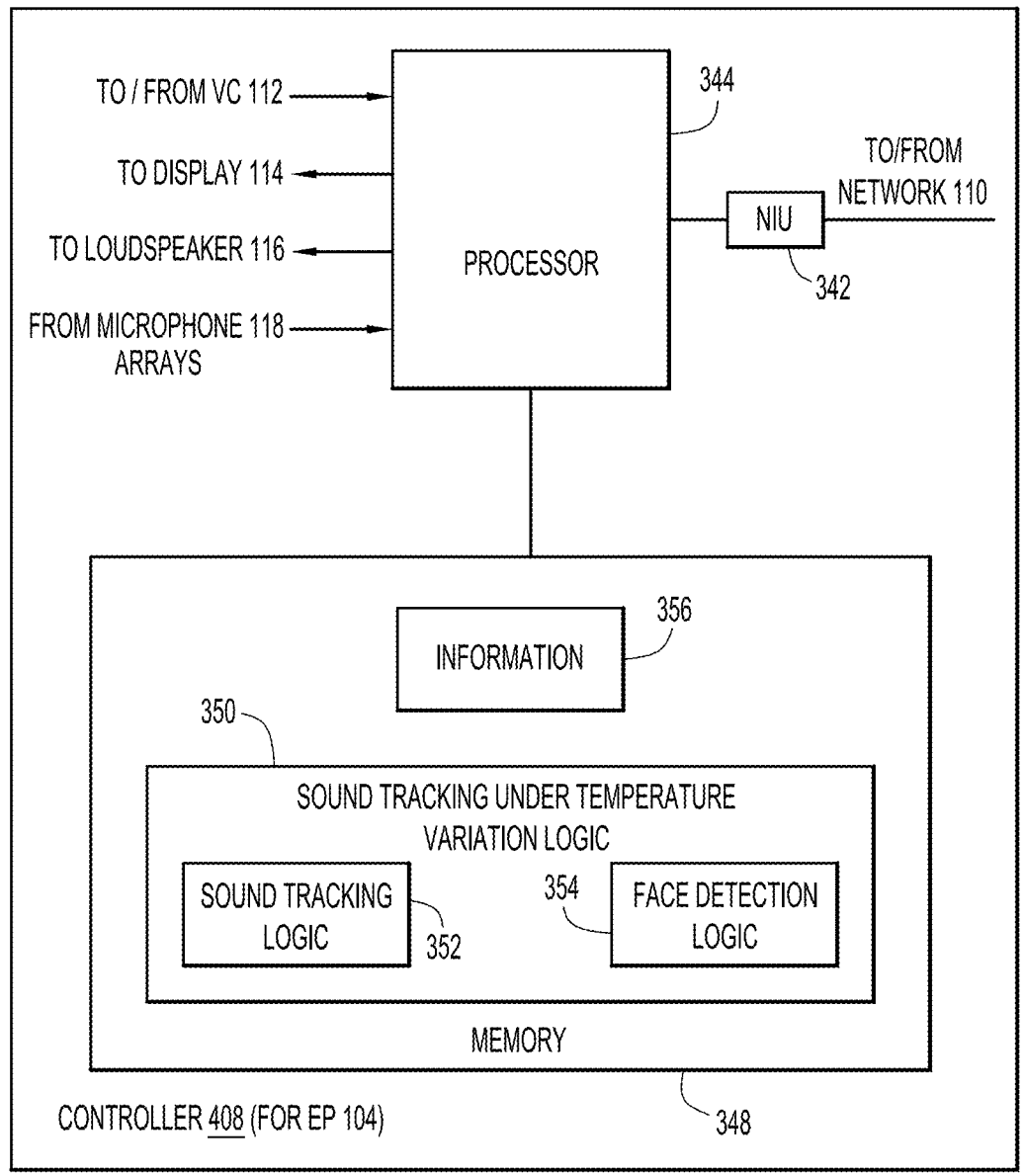
FIG. 3 is a block diagram of a controller of the video conference endpoint configured to perform the techniques presented herein, according to an example embodiment.

Reference is now made to FIG. 3, which shows an example block diagram of a controller 308 of video conference endpoint 104 configured to perform the techniques presented herein. There are numerous possible configurations for controller 308 and FIG. 3 is meant to be an example. Controller 308 includes a network interface unit 342, a processor 344, and memory 348. The network interface (I/F) unit (NIU) 342 is, for example, an Ethernet card or other interface device that allows the controller 308 to communicate over communication network 110. Network I/F unit 342 may include wired and/or wireless connection capability.

Processor 344 may include a collection of microcontrollers and/or microprocessors, for example, each configured to execute respective software instructions stored in the memory 348. The collection of microcontrollers may include, for example: a video controller to receive, send, and process video signals related to display 112 and video camera 112; an audio processor to receive, send, and process audio signals related to loudspeaker 116 and microphone arrays 118; and a high-level controller to provide overall control. Portions of memory 348 (and the instruction therein) may be integrated with processor 344. As used herein, the terms "audio" and "sound" are synonymous and interchangeably. Processor 344 may send pan, tilt, and zoom commands to video camera 112, which is responsive to the commands as would be appreciated by one of ordinary skill in the relevant arts.

The memory 348 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 348 may comprise one or more computer readable storage media (e.g., a memory device) encoded with software comprising computer executable instructions and when the software is executed (by the processor 344) it is operable to perform the operations described herein. For example, the memory 348 stores or is encoded with instructions for Sound Tracking Under Temperature Variation logic 350 to perform operations described herein for precise tracking of an angle of arrival of sound at a microphone array under sound variation. Logic 350 also includes Sound Tracking logic 352 to determine sound angle of arrival, and Face Detection logic 354 to detect faces and determine detected face angles from images.

In addition, memory 348 stores sound tracking and face detection information 356 used and generated by logic 350, 352, and 354, including information associated with detected faces (e.g., positions, angular offsets from a reference axis/direction, confidence areas, confidence levels, and angle difference calibration tables—described below), and information associated with detected motion.

Figure 4:
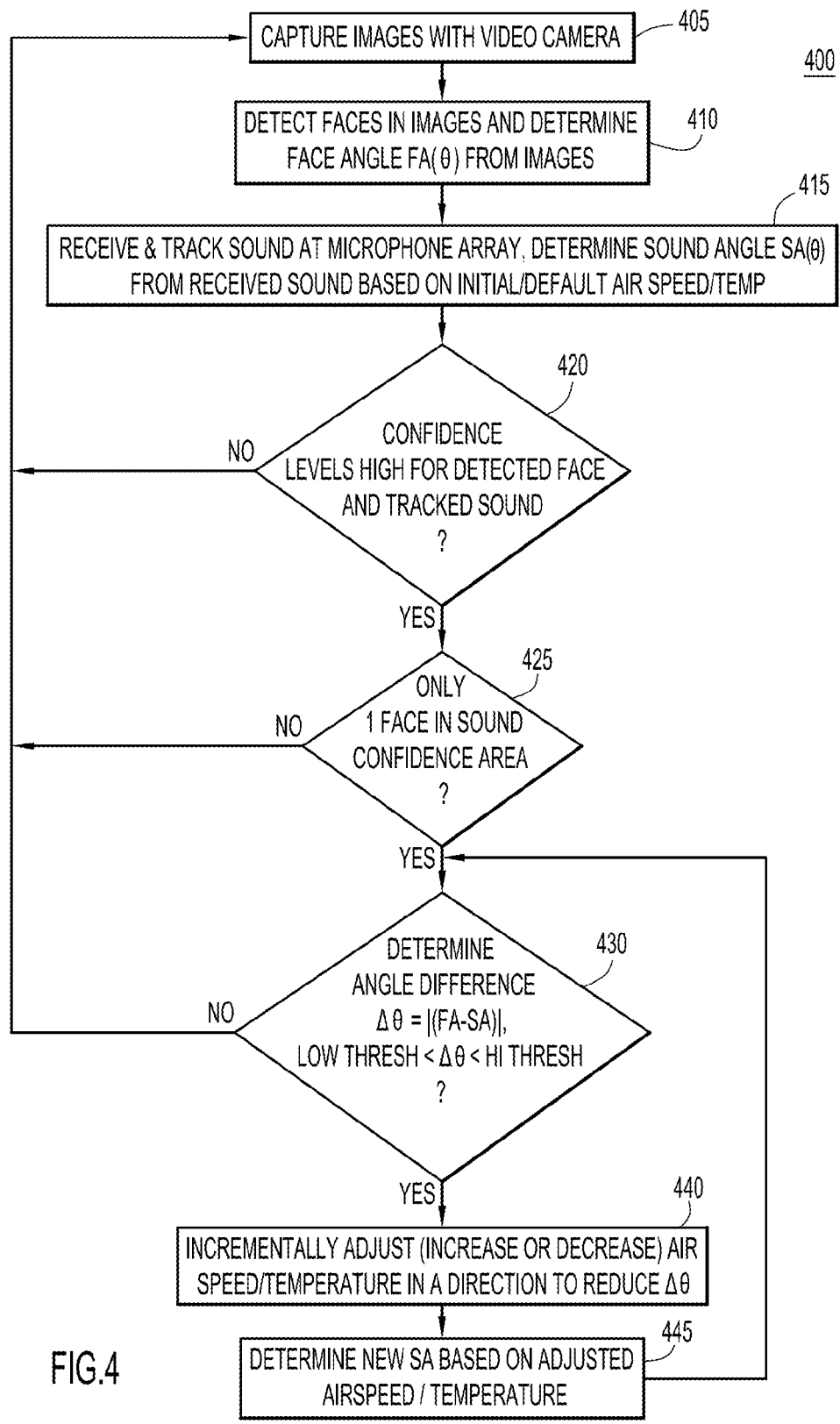
FIG. 4 is a flowchart of a method of precisely tracking sound angle of arrival at a microphone array under temperature variation in a video conference endpoint, according to an example embodiment.

With reference to FIG. 4, there is depicted a flowchart of an example method 400 of precisely tracking an angle of arrival of sound received at microphone array 118 in a video conference endpoint under temperature variation that is performed in endpoint 104 as deployed, for example, in room 204. Controller 308 executed logic 350, including logic 352 and 354 as appropriate, to perform method 400.

At 405, controller 308 initializes camera 112, i.e., commands the camera to initial pan, tilt, and zoom settings to capture a video of a scene of room 206. Camera 112 captures successive video frames of the scene.

At 410, controller 308 (using Face Detection Logic 352) detects faces and associated face positions and face angles of participants 106 in the captured scene based on an analysis of the video frames. Each face angle represents an angle of the associated detected face from a reference direction centered in the captured scene. Controller 308 stores information in memory 348 associated with the detected faces, e.g., the number of times (instances) when the faces were detected and associated positions and face angles thereof. Controller 308 may use any now known or hereafter developed technique to detect faces. Typically, such techniques detect facial features, such as eyes, nose, mouth, hair, etc.

Controller 308 validates detected faces and uses the stored information associated with the validated detected faces for subsequent operations described below. In an embodiment, controller 308 validates each detected face if the face positions thereof detected in successive video frames predominantly fall within a confidence or correlation area associated with that face. In an embodiment, the confidence area may be a rectangular area (a box) initially set to a predetermined size at 405. A validated detected face is considered a face that is detected with a high level of confidence, whereas a detected face that has not been validated is considered a face that is not detected with a high level of confidence.

Figure 5:
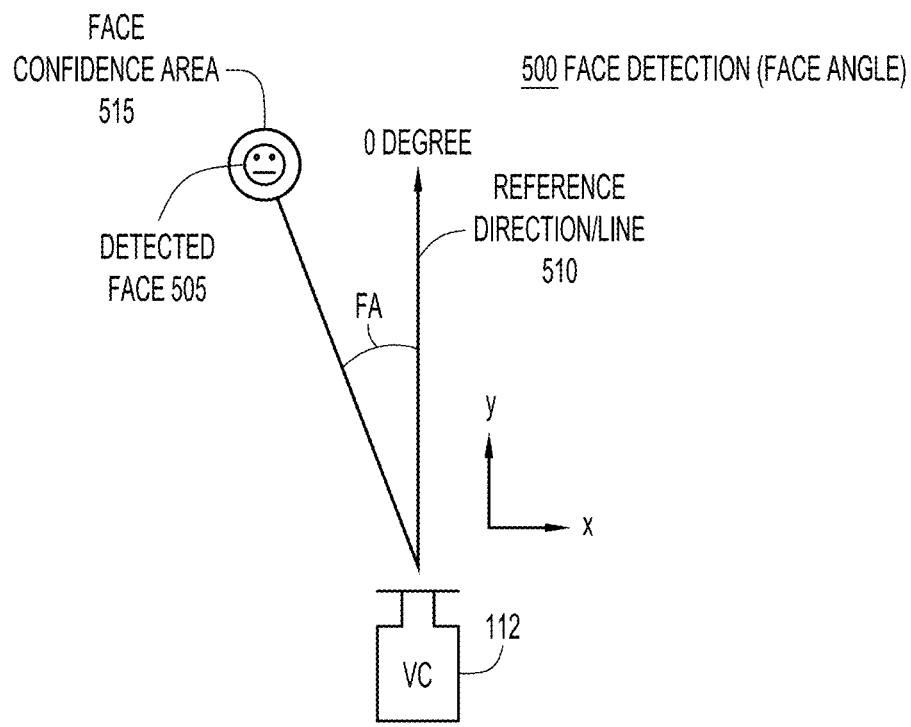
FIG. 5 is an illustration of a face detection arrangement in which a face of a participant is detected at a face angle offset from a reference direction, according to an example embodiment.

Turning to FIG. 5, there is an illustration of an example face detection arrangement 500 in which a face 505 of one of participants 106 is detected at a face angle FA(θ) offset from a centered reference direction/line 510 that corresponds with a y-axis in FIG. 5. Detected face 505 is detected within a confidence area 515 depicted as a circle, although the confidence area may also be a rectangle. Multiple faces may be detected for participants 106, although only one is shown in FIG. 5.

Returning to FIG. 4, at 415, each microphone array 118 receives sound from a talking participant 106 and transduces the received sound into sound signals. The sound may originate from the same one of participants 106 whose face was detected at 410, for example. Controller 308 tracks an angle of arrival (or receive direction) of the sound received at each microphone array 118 relative to the reference direction/line based on the sound signals and a default or assumed value for a parameter indicative of the speed of sound in air. In examples, the parameter may be air speed or, alternatively, air temperature on which the air speed depends. The determined angle of arrival is referred to herein as the "sound angle." Any known or hereafter developed technique to determine the sound angle may be used, such as techniques that use differences in phases or time-of-arrivals (TOAs) of sound received at individual microphones in microphone array 118.

Similar to detecting faces at 410, controller 308 may determine the sound angle with a high level of confidence or a low level of confidence. Any known technique may be used to determine the level of confidence. For example, sound sensed at different ones of microphone arrays 118 (or different individual microphones within the same array) may be cross-correlated to produce a cross-correlation level indicative of a received sound signal-to-noise ratio. If a peak cross-correlation level exceeds a predetermined confidence threshold, then the sound angle is deemed to be determined with a high level of confidence, otherwise, the sound angle is deemed to be determined with a low confidence level.

Figure 6:
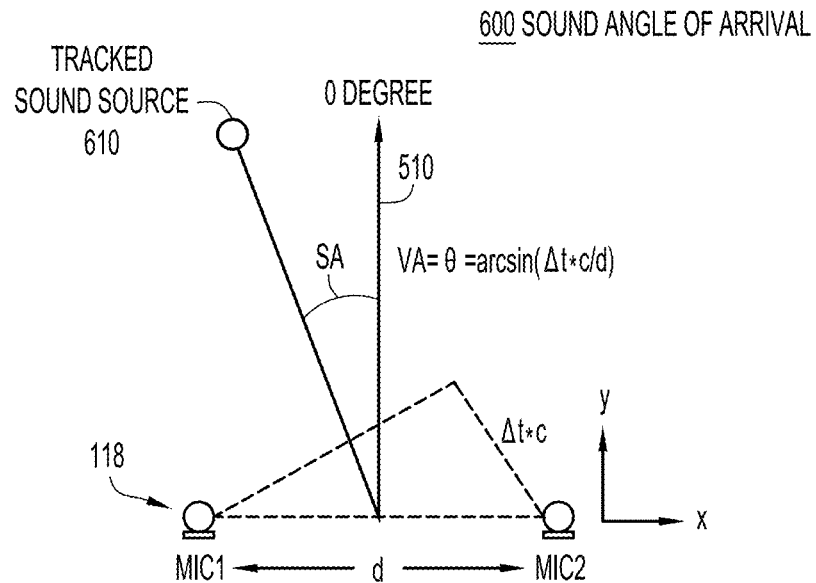
FIG. 6 is an illustration of an arrangement in which a controller of the endpoint tracks a sound source corresponding to the participant based on sound signals produced by spaced-apart microphones, according to an example embodiment.

Turning to FIG. 6, there is an illustration of an example arrangement 600 in which controller 308 tracks a sound source 610 corresponding to one of participants 106 based on sound signals from spaced-apart microphones MIC1 and MIC2 of microphone array 118. In one embodiment, controller 308 determines a sound angle SA(θ) for sound source 605 relative to reference direction 510 based on a TOAs difference technique. Specifically, controller 308 measures a time difference Δt between TOAs of sound received at microphones MIC1 and MIC2, assumes a default value for a parameter indicative of the speed of sound in air (which may be a default air speed or a default air temperature on which the air speed depends), and then determines sound angle SA using the aforementioned information according to the formula:

Sound Angle(SA)=arc sin(Δt*c/d), where:

Δt=the TOA time difference;
d=the microphone spacing; and c=the speed of sound in air at a given air temperature T, where
c=3.31+0.606*T(in ° C.)m/s.

In an example, the default temperature T=25° C.

The default temperature T used to determine sound angle SA may be different from an actual temperature of the air through which the sound traveled to microphones MIC1 and MIC2. If the default and actual temperatures are different, so too are the determined sound angle SA and an actual sound angle different. In other words, the determined sound angle is incorrect. It can be shown experimentally and theoretically that when the actual air temperature is higher than the assumed air temperature (i.e., the actual speed of sound is higher than the assumed speed of sound), the determined sound angle is less than the face angle. Conversely, when the actual air temperature is less than the assumed air temperature (i.e., the actual speed of sound is less than the assumed speed of sound), the determined sound angle is greater than the face angle.

Returning again to FIG. 4, at 420, controller 308 determines whether both the detected face confidence level and the determined sound angle confidence level are both high confidence levels. If they are, flow proceeds to 425, but if they are not, flow returns to 405. Operation 420 is optional.

At 425, controller 308 determines whether the tracked sound and one of the detected faces coincide with each other within a predetermined criterion. To do this, in one embodiment, controller 308 determines if only one detected face coincides or falls within a sound angle confidence range encompassing sound angle SA. If only one detected face coincides with the sound angle confidence range, the predetermined criterion is met and process flow proceeds to 430. Otherwise, flow returns to 405.

Figure 7:
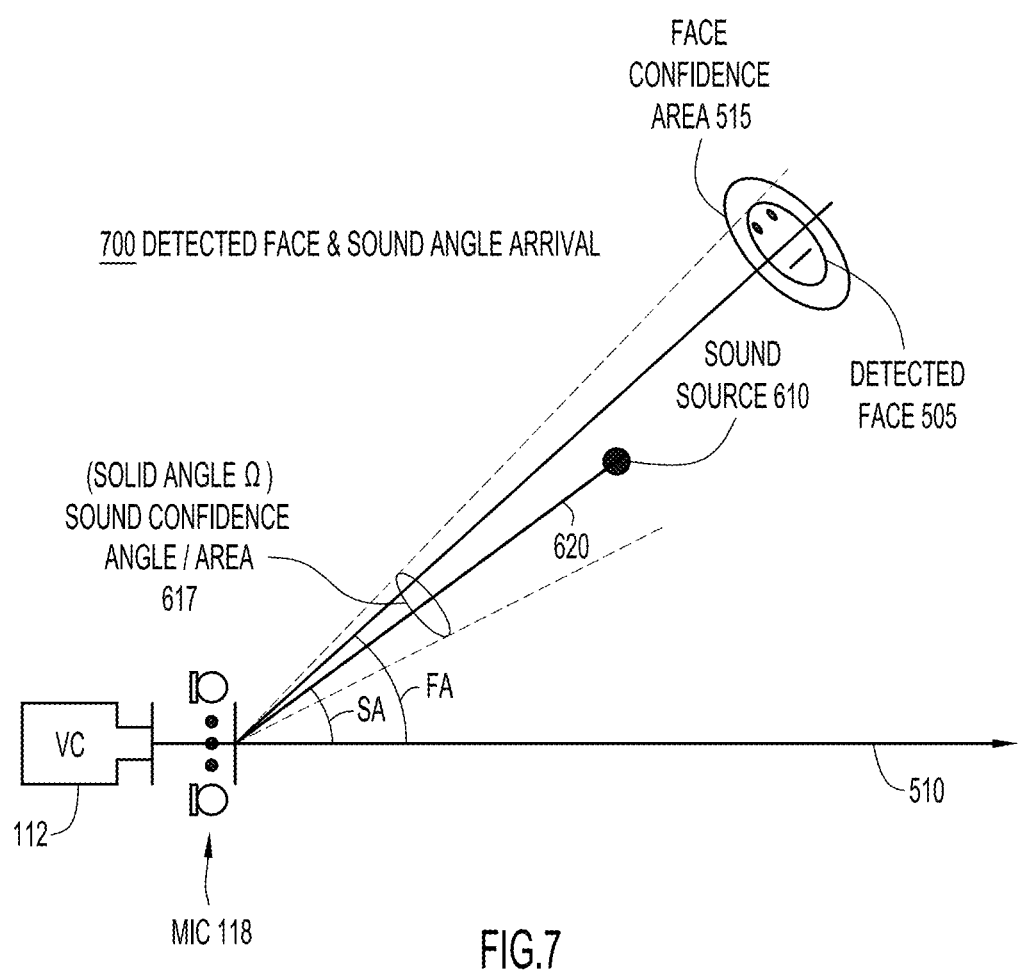
FIG. 7 is an illustration of a combined detected face and tracked sound arrangement, according to an example embodiment.

Turning to FIG. 7, there is an illustration of a combined detected face and tracked sound arrangement 700 that superimposes detected face arrangement 500 of FIG. 5 on sound angle of arrival arrangement 600 of FIG. 6. Associated with sound angle SA is a solid angle 617 centered on a direction line 620 pointing from origin O to sound source 610 (i.e., that is angularly offset from reference line 510 by sound angle SA). Solid angle 617 represents the above-mentioned sound angle confidence range around sound angle SA. In an example, solid angle 617 has a 10° angular radius. In the example of FIG. 7, only detected face 515 coincides with sound angle confidence range 617 (i.e., falls within the solid angle 617), thus meeting the predetermined criterion tested in operation 425.

Returning again to FIG. 4, at 430, controller 308 determines an absolute angle difference Δθ between face angle FA and sound angle SA (i.e., angle difference Δθ=|FA−SA|. Angle difference Δθ is referred to as the angle bias between face angle FA and sound angle SA. Controller 308 compares absolute angle difference Δθ to a low angle threshold (e.g., 1°) and a high angle threshold (e.g., 10°). In an embodiment, the high angle threshold is equal to the angular radius of the sound angle confidence range mentioned above. If the absolute angle difference Δθ is greater than the low angle threshold and less than the high angle threshold (i.e., falls within a predetermined angle difference range defined between the low and high angle thresholds), flow proceeds to 440 and 450. Otherwise, flow returns to 405.

At 440, controller 308 incrementally adjusts (i.e., increases or decreases) the value of the parameter indicative of the air speed in a direction to reduce the absolute angle difference Δθ when sound angle SA is recomputed based on the adjusted value. If the parameter is temperature, then controller 308 adjusts the temperature. If the parameter is sound speed, then controller 308 adjusts the speed.

To implement operation 440, controller 308 first compares sound angle SA to face angle FA.

If the compare operation indicates sound angle SA is less than face angle FA, controller 308 incrementally increases the value of the parameter indicative of the air speed (e.g., increases the temperature or increases the air speed, depending on which parameter is used). Flow proceeds to 445.

If the compare operation indicates sound angle SA is greater than face angle FA, controller 308 incrementally decreases the value of the parameter indicative of the air speed. Flow proceeds to 445.

The increment or step size used in operation 440 may be fixed or variable. Use of a variable step size in method 500 may advantageously result in a faster convergence than use of a fixed step size. In one embodiment, a variable increment/step size may be proportional to a ratio of angle difference $\Delta\theta$ to determined sound angle SA.

At 445, controller 308 determines sound angle SA again (i.e., re-computes SA) based on the adjusted (incrementally increased or decreased) value of the parameter indicative of air speed. The result is to incrementally adjust determined sound angle SA in a direction toward face angle FA so that the sound angle converges toward the face angle.

Flow returns to operation 430. Operations 430, 440, and 445 are repeated to bring determined sound angle SA a little closer to face angle FA in each iteration through the operations, until the compare at 430 indicates the absolute angle difference $\Delta\theta$ has converged to a value that is less than the low angle threshold. This is the point at which sound tracking has adapted to the actual air temperature in e.g., room 204. At that point, flow returns to 405. The last incrementally adjusted value of the assumed parameter (e.g., temperature) that resulted in a close match between determined sound angle SA and face angle FA is referred to as the final assumed parameter (e.g., the final assumed temperature), and may be stored in memory 348 for further processing.

In an alternative embodiment, the iterations of operations 430, 440, and 445 in method 400, used to determine the final assumed parameter (e.g., temperature) that zeroes-out the angle difference between the sound and face angles, are replaced with a simple look-up operation based on a calibration table that maps face-to-angle differences to corresponding calibrated temperatures (i.e., final assumed temperatures). The memory table is populated with entries during an a priori calibration phase, now described in connection with FIG. 8.

Figure 8:
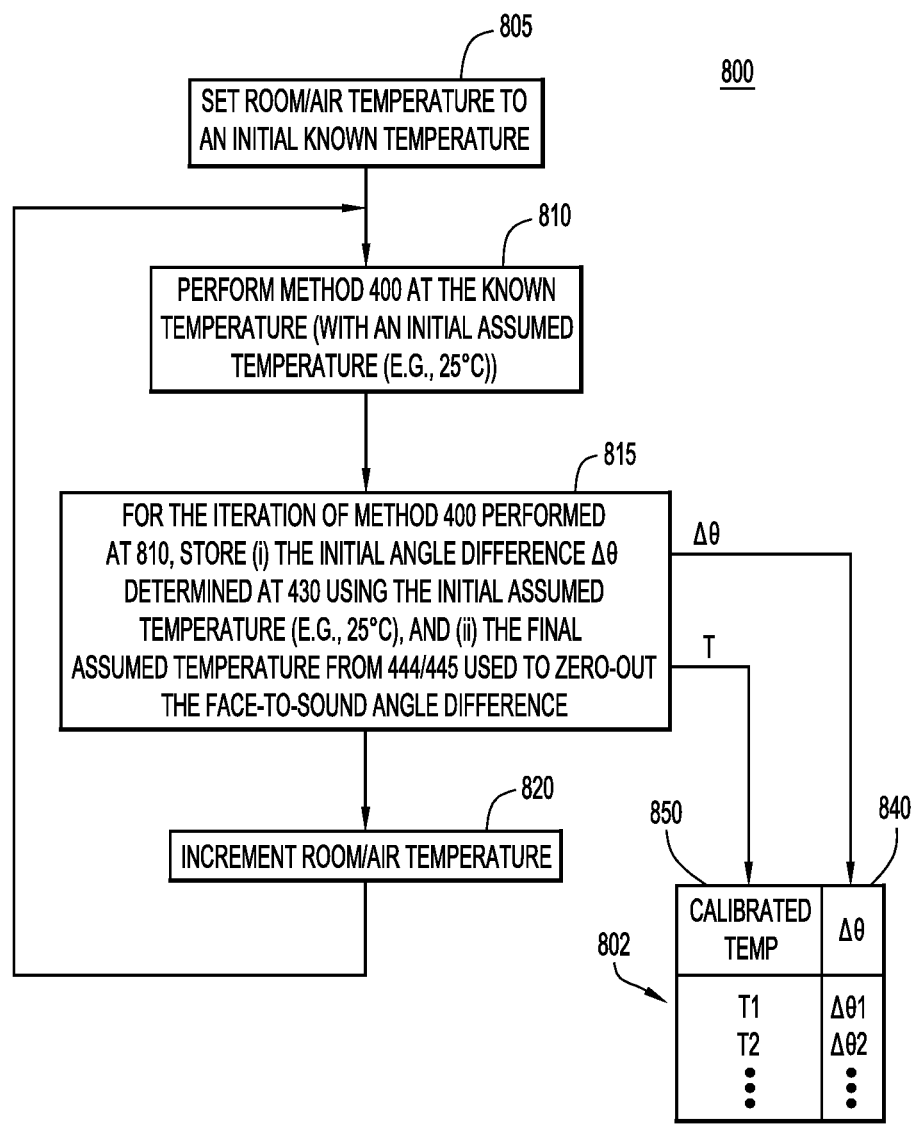
FIG. 8 is a flowchart of an example method of constructing a calibration table that maps sound-to-face angle differences to corresponding calibrated air temperatures that are used to compute sound angles.

With reference to FIG. 8, there is depicted a flowchart of an example method 800 of constructing a calibration table 802 that maps sound-to-face angle differences to corresponding calibrated air temperatures (the parameter representative of air speed) that are used to compute sound angles. Method 800 relies on method 400 to construct table 802. Method 800 is performed in a temperature controlled environment.

At 805, the room/air temperature is set to an initial known temperature, e.g., 18° C.

At 810, an iteration of method 400 is performed at the known room/air temperature, with an initial assumed temperature of, e.g., 25° C.

At 815, for the iteration of method 400 performed at 410, controller 308 records in table 802:

a. the initial angle difference $\Delta\theta$ determined at 430 (during the first path through operation 430) based on the initial assumed temperature (e.g., 25° C.); and b. the final assumed temperature determined at 445 (used to compute the sound angle that zeroes-out the angle difference between the sound and face angles). The final assumed temperature is referred to as the "calibrated temperature" corresponding to the face-to-sound angle difference $\Delta\theta$.

At 820, the known room/air temperature is incremented by a default temperature step size, e.g., 1° C., and flow returns to operation 810.

The above calibration operations are repeated multiple times until table 802 stores a list of face-to-sound angle differences (in table column 840) each mapped to a corresponding one of calibrated temperatures (in table column 850) over a predetermined range of known air/room temperatures.

Once calibration table 802 is constructed using calibration method 800, a simple look-up may be used to retrieve a calibrated temperature based on a given face-to-sound angle difference $\Delta\theta$ measured at operation 430, which avoids subsequent iterations through operations 440, 445, and 430. In other words, the look-up operation replaces operations 440 and 445.

In summary, in one form, a method is provided, comprising: detecting a face and determining a face angle of the detected face relative to a reference direction based on images of a scene including one or more faces captured by a camera; transducing sound received at a microphone array; determining a sound angle of arrival of the sound received at the microphone array relative to the reference direction based on the transduced sound and a sound speed parameter indicative of a speed of sound in air; comparing the face angle against the sound angle; and if the comparing indicates an angle difference greater than zero between the face and sound angles, adjusting the sound speed parameter so as to reduce the angle difference.

In summary, in another form, an apparatus is provided, comprising: a video camera configured to capture images of a scene; a microphone array configured to transduce sound received at the microphone array; and a processor, coupled to the video camera and the microphone array, configured to: detect a face and determine a face angle of the detected face relative to a reference direction based on the captured images; determine a sound angle of arrival of sound received at the microphone array relative to the reference direction based on the transduced sound and a sound speed parameter indicative of a speed of sound in air; compare the face angle against the sound angle; and if the compare indicates an angle difference greater than zero between the face and sound angles, adjust the sound speed parameter so as to reduce the angle difference.

In summary, in yet another form, a processor readable medium is provided. The processor readable medium stores instructions that, when executed by a processor, cause the processor to: detect a face and determine a face angle of the detected face relative to a reference direction based on images of a scene captured by a camera; access transduced sound produced by a microphone array responsive to sound received at the microphone array; determine a sound angle of arrival of the sound received at the microphone array relative to the reference direction based on the transduced sound and a sound speed parameter indicative of a speed of sound in air; compare the face angle against the sound angle; and if an angle difference is greater than zero between the face and sound angles, adjust the sound speed parameter so as to reduce the angle difference.

The above description is intended by way of example only. Various modifications and structural changes may be made therein without departing from the scope of the concepts described herein and within the scope and range of equivalents of the claims.

What is claimed is:

1. A method comprising:
   detecting a face and determining a face angle of the detected face relative to a reference direction based on images of a scene including one or more faces captured by a camera;
   transducing sound received at a microphone array;
   determining a sound angle of arrival of the sound received at the microphone array relative to the reference direction based on the transduced sound and a sound speed parameter indicative of a speed of sound in air;
   comparing the face angle against the sound angle; and
   if the comparing indicates an angle difference greater than zero between the face and sound angles, adjusting the sound speed parameter so as to reduce the angle difference.

2. The method of claim 1, wherein if the comparing indicates the sound angle is less than or greater than the face angle, the adjusting includes increasing or decreasing the sound speed parameter to reduce the angle difference, respectively.

3. The method of claim 2, wherein:
   the adjusting includes incrementally adjusting the sound speed parameter; and
   the method further comprises repeating, the determining a sound angle, the comparing, and the adjusting using the incrementally adjusted sound speed parameter until the comparing indicates the angle difference is within a predetermined angle range.

4. The method of claim 2, further comprising:
   if the comparing indicates the angle difference is within a predetermined angle range, performing the adjusting; and
   if the comparing indicates that the angle difference is not within the predetermined angle range, not performing the adjusting.

5. The method of claim 4, wherein:
   the detecting a face includes detecting the face with a detected face confidence level;
   the determining a sound angle includes determining the sound angle with a determined sound angle confidence level; and
   the method further comprises:
      performing the comparing and the adjusting if the detected face confidence level and the determined sound angle confidence levels are each a relatively high confidence level; and
      not performing the comparing and the adjusting if the detected face confidence level and the determined sound angle confidence levels are not each a relatively high confidence level.

6. The method of claim 2, wherein the method further comprises:
   performing the comparing and the adjusting if the face angle is within a predetermined solid angle that represents an angle confidence range centered on the sound angle; and
   not performing the comparing and the adjusting if the face angle is not within the predetermined angle confidence range centered on the sound angle.

7. The method of claim 6, wherein the method further comprises:
   performing the comparing and the adjusting if the face angle of only one detected face is within the predetermined angle confidence range; and
   not performing the comparing and the adjusting if face angles of multiple detected faces are within the predetermined angle confidence range.

8. The method of claim 2, further comprising:
   constructing a memory table that maps calibrated temperatures that are representative of the parameter indicative of the speed of sound in air to corresponding angle differences between face angles and corresponding sound angles determined based on an assumed temperature, wherein:
   the comparing indicates an angle difference between the determined face and sound angles; and
   the adjusting includes accessing a calibrated temperature from the memory table based on the indicated angle difference such that a sound angle determined based on the accessed calibrated temperature matches the determined face angle within a predetermined range.

9. The method of claim 1, wherein the determining a sound angle includes:
   determining a time-of-arrival (TOA) difference between TOAs of the sound received at individual microphones in the microphone array based on the transduced sound; and
   determining the sound angle based on the TOA difference and the sound speed parameter.

10. The method of claim 1, wherein the sound speed parameter is one of air temperature and the speed of sound in air.

11. An apparatus comprising:
   a video camera configured to capture images of a scene;
   a microphone array configured to transduce sound received at the microphone array; and
   a processor, coupled to the video camera and the microphone array, configured to:
      detect a face and determine a face angle of the detected face relative to a reference direction based on the captured images;
      determine a sound angle of arrival of sound received at the microphone array relative to the reference direction based on the transduced sound and a sound speed parameter indicative of a speed of sound in air;
      compare the face angle against the sound angle; and
      if the compare indicates an angle difference greater than zero between the face and sound angles, adjust the sound speed parameter so as to reduce the angle difference.

12. The apparatus of claim 11, wherein if the compare indicates the sound angle is less than or greater than the face angle, the processor is configured to increase or decrease the sound speed parameter to reduce the angle difference, respectively.

13. The apparatus of claim 12, wherein the processor is further configured to:
   incrementally adjust the sound speed parameter; and
   repeat the determine a sound angle, the compare, and the adjust operations using the incrementally adjusted sound speed parameter until the compare indicates the angle difference is within a predetermined angle range.

14. The apparatus of claim 12, wherein the processor is configured to:
   if the compare indicates the angle difference is within a predetermined angle range, perform the adjust operation; and if the compare indicates the angle difference is not within a predetermined angle range, not perform the adjust operation.

15. The apparatus of claim 12, wherein the processor is configured to:
    perform the compare and the adjust operations if the face angle is within a predetermined solid angle that represents an angle confidence range centered on the sound angle; and
    not perform the compare and the adjust operations if the face angle is not within the predetermined angle confidence range centered on the sound angle.

16. The apparatus of claim 15, wherein the processor is configured to:
    perform the compare and the adjust operation if the face angle of only one detected face is within the predetermined angle confidence range; and
    not perform the compare and the adjust operations if the face angles of multiple detected faces are within the predetermined angle confidence range.

17. A non-transitory processor readable medium storing instructions that, when executed by a processor, cause the processor to:
    detect a face and determine a face angle of the detected face relative to a reference direction based on images of a scene captured by a camera;
    access transduced sound produced by a microphone array responsive to sound received at the microphone array;
    determine a sound angle of arrival of the sound received at the microphone array relative to the reference direction based on the transduced sound and a sound speed parameter indicative of a speed of sound in air;
    compare the face angle against the sound angle; and
    if an angle difference is greater than zero between the face and sound angles, adjust the sound speed parameter so as to reduce the angle difference.

18. The non-transitory processor readable medium of claim 17, wherein the instructions include instructions to cause the processor to: if the sound angle is less than or greater than the face angle, increase or decrease the sound speed parameter to reduce the angle difference, respectively.

19. The non-transitory processor readable medium of claim 18, wherein the instructions include instructions to cause the processor to:
    incrementally adjust the sound speed parameter; and
    repeat the determine a sound angle, the compare, and the adjust operations using the incrementally adjusted sound speed parameter until the compare indicates the angle difference is within a predetermined angle range.

20. The non-transitory processor readable medium of claim 18, further including instructions to cause the processor to:
    if the angle difference is within a predetermined angle range, perform the adjust operation; and
    if the angle difference is not within a predetermined angle range, not perform the adjust operation.

21. The non-transitory processor readable medium of claim 18, further including instructions to cause the processor to:
    perform the compare and the adjust operations if the face angle is within a predetermined solid angle that represents an angle confidence range centered on the sound angle; and
    not perform the compare and the adjust operations if the face angle is not within the predetermined angle confidence range centered on the sound angle.

22. The non-transitory processor readable medium of claim 21, further including instructions to cause the processor to:
    perform the compare and the adjust operation if the face angle of only one detected face is within the predetermined angle confidence range; and
    not perform the compare and the adjust operations if the face angles of multiple detected faces are within the predetermined angle confidence range.

* * * * *